United States Patent
Wang et al.

(10) Patent No.: US 8,376,630 B2
(45) Date of Patent: Feb. 19, 2013

(54) HYBRID 8P8C RJ-45 MODULAR PLUG CONFIGURED WITH BOTH OPTICAL AND ELECTRICAL CONNECTIONS FOR PROVIDING BOTH OPTICAL AND ELECTRICAL COMMUNICATIONS CAPABILITIES, AND A METHOD

(75) Inventors: Tak Kui Wang, Cupertino, CA (US); Chung-Yi Su, Fremont, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/222,094

(22) Filed: Aug. 31, 2011

(65) Prior Publication Data

US 2011/0311187 A1 Dec. 22, 2011

Related U.S. Application Data

(63) Continuation-in-part of application No. 12/754,545, filed on Apr. 5, 2010.

(51) Int. Cl.
*G02B 6/36* (2006.01)
*G02B 6/00* (2006.01)
(52) U.S. Cl. .......................... 385/78; 385/139
(58) Field of Classification Search .............. 385/76–78, 385/83, 84, 139
See application file for complete search history.

(56) References Cited

U.S. PATENT DOCUMENTS

| | | | |
|---|---|---|---|
| 5,599,206 A | 2/1997 | Slack et al. | |
| 5,745,622 A | 4/1998 | Bimbaum et al. | |
| 5,896,480 A | 4/1999 | Scharf et al. | |
| 6,341,899 B1 | 1/2002 | Shirakawa et al. | |
| 6,381,283 B1 | 4/2002 | Bhardwaj et al. | |
| 6,500,026 B2 | 12/2002 | Yamaguchi | |
| 6,588,938 B1 | 7/2003 | Lampert et al. | |
| 7,147,519 B2 | 12/2006 | Reichle | |
| 7,326,087 B2 | 2/2008 | Gerlach et al. | |
| 7,488,115 B2 | 2/2009 | Theis | |
| 8,011,972 B2 * | 9/2011 | Caveney et al. | 439/676 |
| 2005/0186822 A1 | 8/2005 | Serino et al. | |
| 2006/0263011 A1 | 11/2006 | Chen et al. | |

FOREIGN PATENT DOCUMENTS
EP 2075604 7/2009

* cited by examiner

*Primary Examiner* — Kevin S Wood

(57) ABSTRACT

A hybrid RJ-45 plug is provided that has both an electrical coupling configuration and an optical coupling configuration. The electrical coupling configuration is an 8P8C electrical wiring configuration that complies with the RJ-45 electrical wiring standard. The optical coupling configuration includes an optics system that provides the plug with optical communications capabilities. The hybrid RJ-45 plug is backwards compatible with an existing RJ-45 jack that implements an RJ-45 electrical wiring standard. However, the hybrid RJ-45 plug is also configured to mate with an optical jack that has only optical communications capabilities and to mate with a hybrid RJ-45 jack that has both optical and electrical communications capabilities.

20 Claims, 9 Drawing Sheets

HYBRID 8P8C RJ-45 MODULAR PLUG CONFIGURED WITH BOTH OPTICAL AND ELECTRICAL CONNECTIONS FOR PROVIDING BOTH OPTICAL AND ELECTRICAL COMMUNICATIONS CAPABILITIES, AND A METHOD

CROSS-REFERENCE TO RELATED APPLICATIONS

This application is a continuation-in-part application of application Ser. No. 12/754,545, filed on Apr. 5, 2010, entitled "A MODULAR CONNECTOR ASSEMBLY CONFIGURED WITH BOTH OPTICAL AND ELECTRICAL CONNECTIONS FOR PROVIDING BOTH OPTICAL AND ELECTRICAL COMMUNICATIONS CAPABILITIES, AND A SYSTEM THAT INCORPORATES THE ASSEMBLY", which is currently pending and which is incorporated herein by reference in its entirety.

TECHNICAL FIELD OF THE INVENTION

The invention relates to a hybrid eight position, eight contact (8P8C) modular RJ-45 plug having an electrical coupling configuration that complies with T-568A and/or T-568B wiring standards and having an optical coupling configuration that provides the plug with optical communications capabilities.

BACKGROUND OF THE INVENTION

A variety of modular connector assemblies are used to electrically couple electrical signals between the ends of electrical conductors contained in electrical cables and electrical contacts of electrical circuitry of terminal equipment connected to the ends of the cables. A modular connector assembly has a plug that terminates the end of the electrical cable and a jack that mates with the plug. The exterior surface of the plug and the interior surface of the jack have mating features located on them that mate with each other to removably interlock the plug with the jack. When the plug is interlocked with the jack, respective electrical contacts of the plug are in contact with respective electrical contacts of the jack. The electrical contacts of the plug are electrically coupled with the ends of respective electrical conductors of the cable. Similarly, the electrical contacts of the jack are electrically coupled with respective electrical contacts of electrical circuitry of the terminal equipment. Through all of these electrical connections, electrical signals being carried on the electrical conductors of the cable are electrically coupled to the electrical circuitry of the terminal equipment, and vice versa.

One type of modular connector assembly that is well known in the communications industry is an 8P8C modular connector assembly. The 8P8C modular connector assembly is often used with twisted copper pairs to communicate electrical data signals over Ethernet-based communications networks. In Ethernet-based communications networks, the electrical contacts and other circuitry of the 8P8C connector assembly are configured to comply with the RJ-45 wiring standards, which are also known as the T-568A and T-568B wiring standards. Because these types of modular connector assemblies are made to comply with the RJ-45 wiring standards when they are manufactured for use in Ethernet-based communications networks, they are often referred to as RJ-45 connectors.

Ethernet-based communications networks currently have the capability of carrying electrical data signals at data rates in excess of 1 gigabits per second (Gb/s). Although optical communications links are currently capable of operating at date rates of 10 Gb/s over distances of up to about 100 meters (m), the use of such optical links generally has not spread into areas occupied by high-speed Ethernet-based networks. One reason that the use of optical links has not spread into this space is that the costs of manufacturing pluggable optical modular connector assemblies that can operate at these data rates are much higher than the costs of manufacturing 8P8C modular connector assemblies that operate at these data rates. Another reason that the use of optical links has not spread into this space is that there are currently only a few optical solutions that have backwards compatibility to the existing electrical Ethernet solutions. One such solution is disclosed in U.S. patent application Ser. No. 12/754,545, which is the parent application of the present application.

Although it is possible to design electrical connections that operate at data rates higher than 1 Gb/s using 8P8C modular connectors that implement the RJ-45 wiring standard, such connections would consume much more power than optical connections operating at the same data rate. In addition, the complexity of the design for such high data rate electrical connections would result in the connections being significantly more expensive than those that operate at 1 Gb/s. Furthermore, a new cabling scheme with higher costs would be required to propagate the data signals at data rates higher than 1 Gb/s over distances of about 100 meters (m).

SUMMARY OF THE INVENTION

The invention is directed to a hybrid RJ-45 plug, a method for assembling a hybrid RJ-45 plug, and a modular connector assembly comprising the plug mated with a jack. The plug comprises a plug body, a carrier positioned within the plug body, an organizer mechanically coupled to the carrier, and first and second optical ports disposed on an inner lower surface of the carrier. The plug body has a front end, a back end, a left side, a right side, a bottom side, a top side, and a latch mechanism. The front end has first and second generally cylindrically-shaped openings formed therein for receiving generally cylindrically-shaped first and second optical ports of a jack, respectively. The carrier has a front end, a back end, a right side, a left side, and an inner lower surface. The front and back ends of the carrier face the front and back ends, respectively, of the plug body. The carrier has a plurality of insulation displacement contacts (IDCs) disposed on the inner lower surface thereof at a location that is in between the front and back ends of the carrier. The IDCs partially extend through the inner lower surface. The carrier has a plurality of electrical contacts disposed on the front end thereof and connected by a plurality of respective electrical conductors to the respective IDCs. The plurality of electrical contacts of the carrier are positioned adjacent the front end of the plug body when the carrier is secured within the plug body.

The organizer has a front end that faces the front end of the carrier and a back end that faces the back end of the carrier. The organizer has a plurality of blind holes extending from the back end of the organizer a distance into the organizer for receiving respective ends of respective electrical conductors. The blind holes end before reaching the front end of the organizer. The organizer has at least first and second longitudinal slots extending from the back end of the organizer to the front end of the organizer for receiving respective ends of respective optical fibers. The respective IDCs partially extend through the organizer into the respective blind holes. The first and second optical ports disposed on the inner lower surface of the carrier have front ends that extend into the first and second generally cylindrically-shaped openings formed on the front end of the plug body and back ends that engage respective front openings of the first and second longitudinal slots of the organizer.

The method comprises providing a plug body, providing a carrier having a plurality of IDCs disposed on the inner lower surface thereof at a location that is in between the front and back ends of the carrier and having a plurality of electrical contacts disposed on the front end thereof and being connected by a plurality of respective electrical conductors to the respective IDCs, providing an organizer having a plurality of holes extending at least partially from a back end of the organizer in a direction toward a front end of the organizer and having at least first and second longitudinal slots extending from the back end of the organizer to the front end of the organizer, placing respective end portions of a plurality of electrical conductors in the respective holes, mechanically coupling the organizer with the carrier such that the IDCs pierce insulating jackets of the respective electrical conductors disposed in the respective holes, placing first and second optical ports having first and second optical fibers, respectively, secured therein on the inner lower surface of the carrier such that front ends of the ports extend into first and second generally cylindrically-shaped openings formed on the front end of the plug body and back ends of the first and second optical ports engage respective front openings of the first and second longitudinal slots of the organizer, and mechanically coupling the carrier with the plug body such that the carrier and the organizer are disposed within an opening formed in the plug body. Portions of the first and second optical fibers are disposed in the first and second longitudinal slots, respectively.

The modular connector assembly comprises the hybrid RJ-45 plug mated with an RJ-45 jack, which may be a standard RJ-45 jack having only electrical communications capabilities or a hybrid RJ-45 jack having both electrical and optical communications capabilities.

These and other features and advantages of the invention will become apparent from the following description, drawings and claims.

DETAILED DESCRIPTION OF AN EXEMPLARY EMBODIMENT

The invention is directed to a hybrid RJ-45 plug having both an electrical coupling configuration and an optical coupling configuration. The electrical coupling configuration is an 8P8C electrical wiring configuration that complies with the RJ-45 electrical wiring standard. The optical coupling configuration includes an optics system that provides the plug with optical communications capabilities. The hybrid RJ-45 plug is backwards compatible with an existing RJ-45 jack that implements an RJ-45 electrical wiring standard. However, the hybrid RJ-45 plug is also configured to mate with an optical jack that has only optical communications capabilities and to mate with a hybrid RJ-45 jack that has both optical and electrical communications capabilities. Therefore, the hybrid RJ-45 plug may be used to communicate optical data signals and/or to communicate electrical data signals.

The term "backwards compatible", as that term is used herein in connection with the hybrid RJ-45 plug, is intended to mean that the hybrid RJ-45 plug can be mated with an existing RJ-45 jack having a typical RJ-45 wiring configuration. Thus, if the hybrid RJ-45 plug is mated with an existing RJ-45 jack, the resulting modular connector assembly will operate as a typical RJ-45 modular connector assembly to transfer electrical data signals between electrical circuitry of the plug and electrical circuitry of the jack.

The term "RJ-45 plug", as that term is used herein, is intended to denote an 8P8C modular plug having an electrical wiring configuration that complies with the T-568A or T-568B electrical wiring standards and having generally the same shape and dimensions that are specified for 8P8C modular plugs in the American National Standards Institute/Telecommunications Industry Association (ANSI/TIA)-1096-A standard. The term "RJ-45 jack", as that term is used herein, is intended to denote an 8P8C modular jack having an electrical wiring configuration that complies with the T-568A or T-568B electrical wiring standards and having generally the same shape and dimensions that are specified for 8P8C modular jacks in the ANSI/TIA-1096-A standard.

Figure 1A:
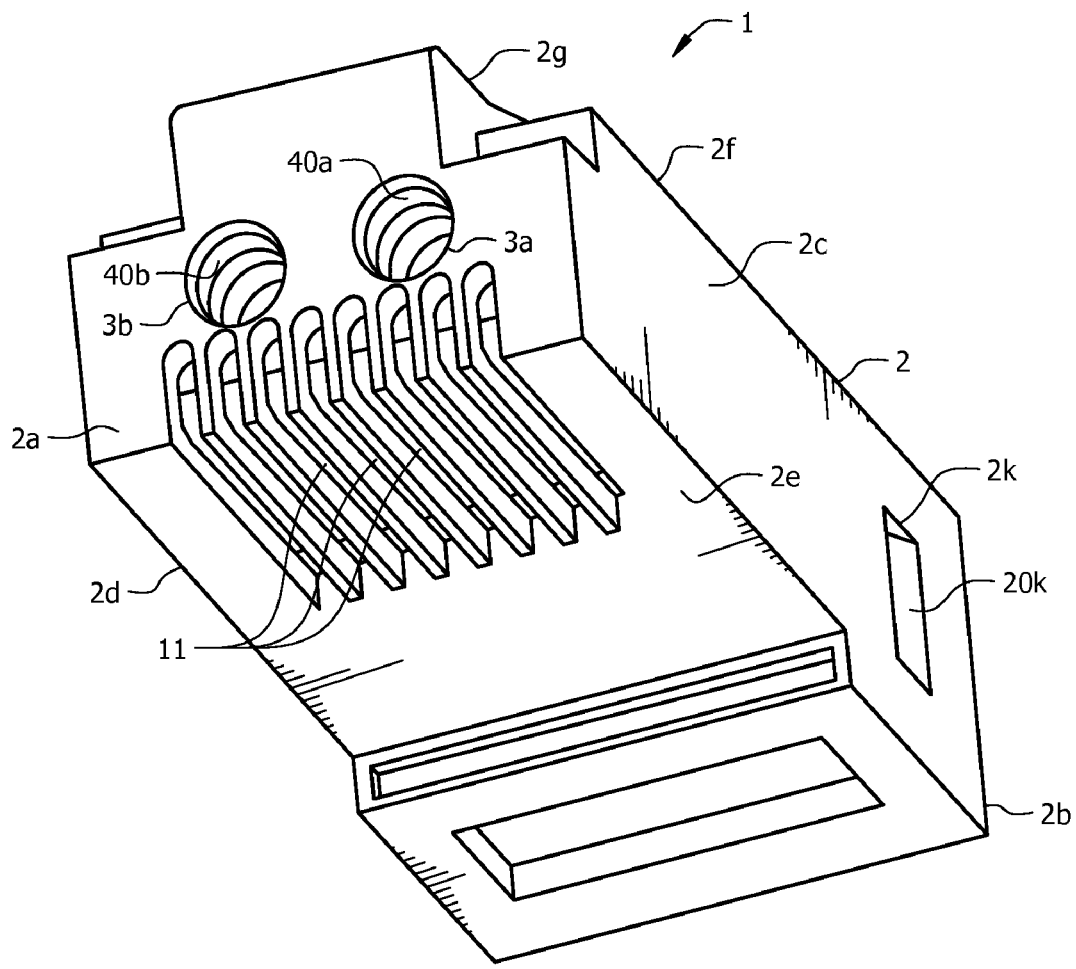
FIGS. 1A and 1B illustrate, respectively, bottom and top perspective views of the hybrid RJ-45 plug in accordance with an illustrative embodiment.
Figure 1B:
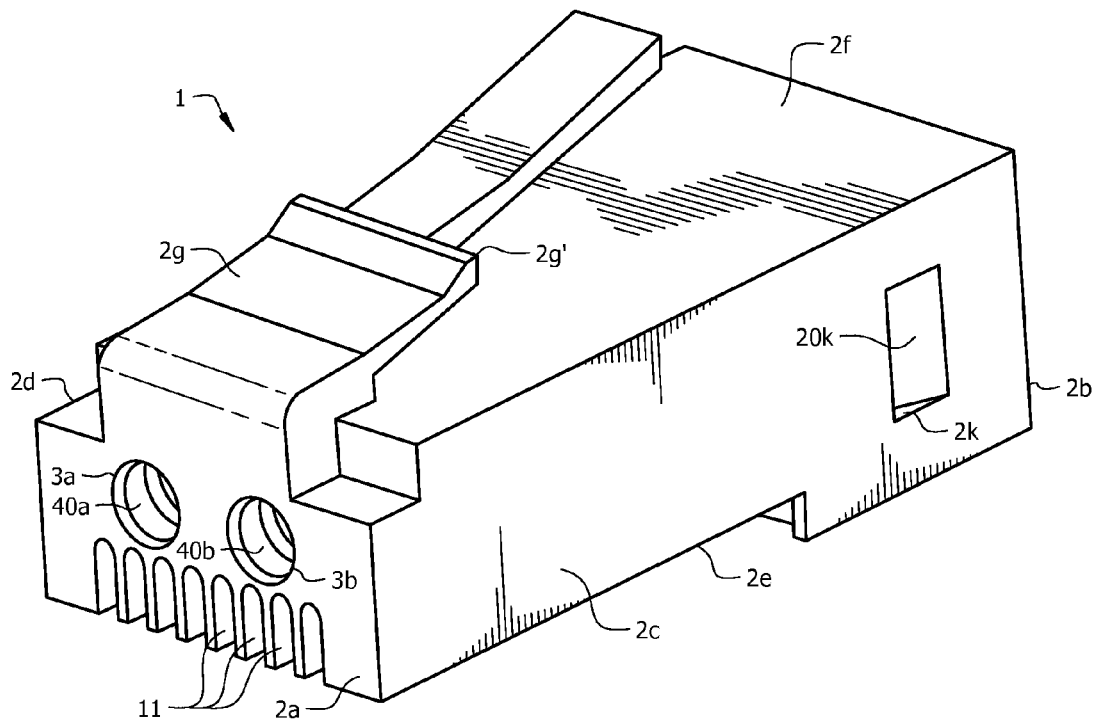

FIGS. 1A and 1B illustrate, respectively, bottom and top perspective views of the hybrid RJ-45 plug 1 in accordance with an illustrative embodiment. The plug 1 has a plug body 2 that has an external shape and dimensions that comply with the ANSI/TIA-1096-A standard to enable the plug 1 to mate with a jack (not shown for purposes of clarity) that is shaped and dimensioned to comply with the ANSI/TIA-1096-A standard. The plug body 2 has a front end 2a, a back end 2b, a right side 2c, a left side 2d, a bottom side 2e, a top side 2f, a latch mechanism 2g, and locking tabs 2k disposed on sides 2c and 2d. First and second openings 3a and 3b are formed in the front end 2a for receiving respective optical ports (not shown for purposes of clarity) disposed inside of a hybrid RJ-45 jack (not shown for purposes of clarity) that mates with the plug 1. Eight electrical contacts 11 are disposed along the front end 2a and a portion of the bottom side 2e of the plug body 2 for making electrical contact with eight respective electrical contacts (not shown for purposes of clarity) disposed within an RJ-45 jack (not shown for purposes of clarity), which may be either a standard RJ-45 jack or a hybrid RJ-45 jack.

Figure 2A:
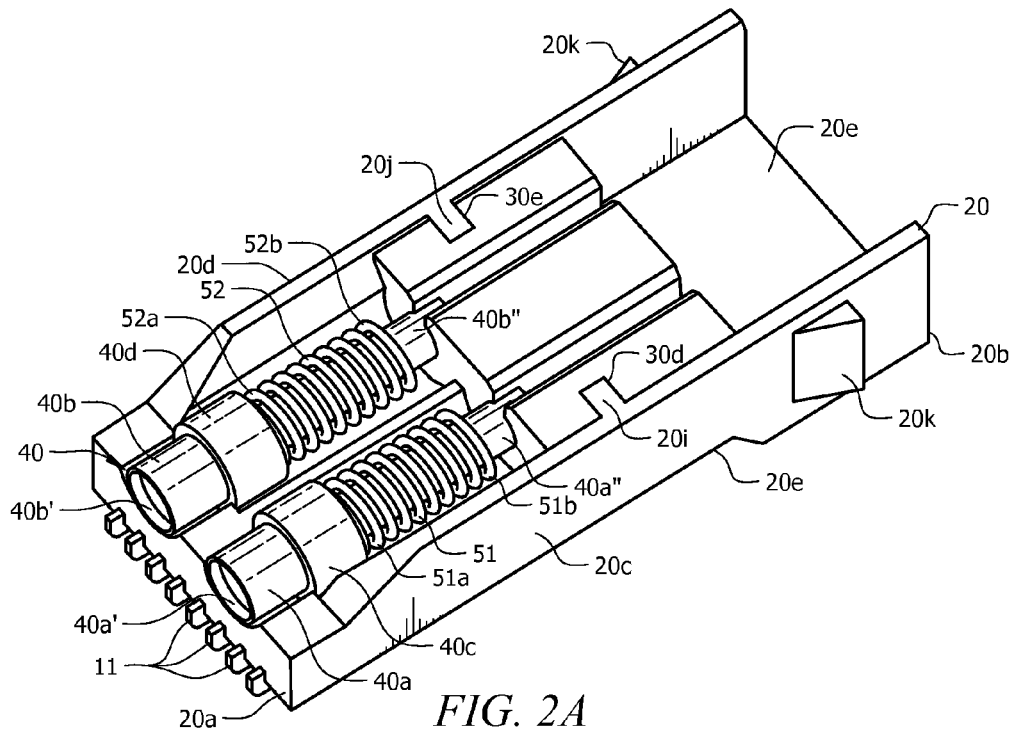
FIGS. 2A and 2B illustrate, respectively, top and back perspective views of a carrier of the hybrid RJ-45 plug shown in FIG. 1 having an organizer and a movable optics system disposed therein in accordance with an illustrative embodiment.
Figure 2B:
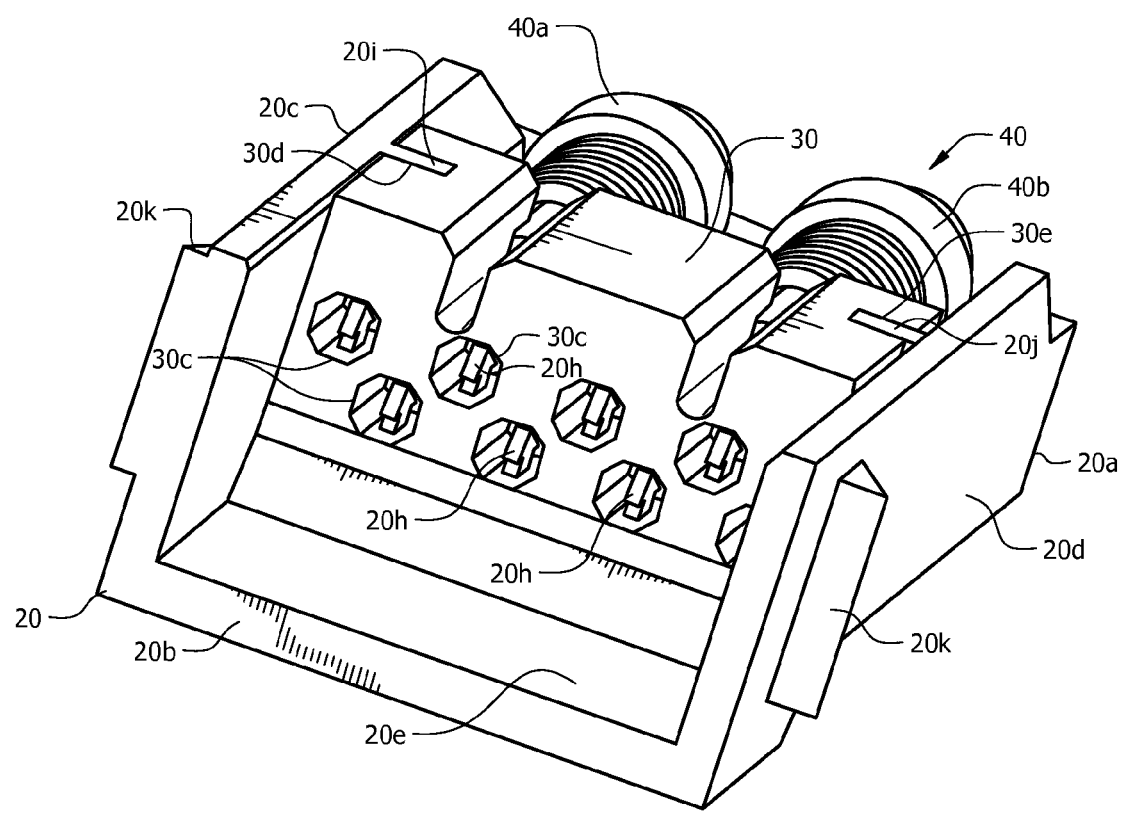
Figure 3:
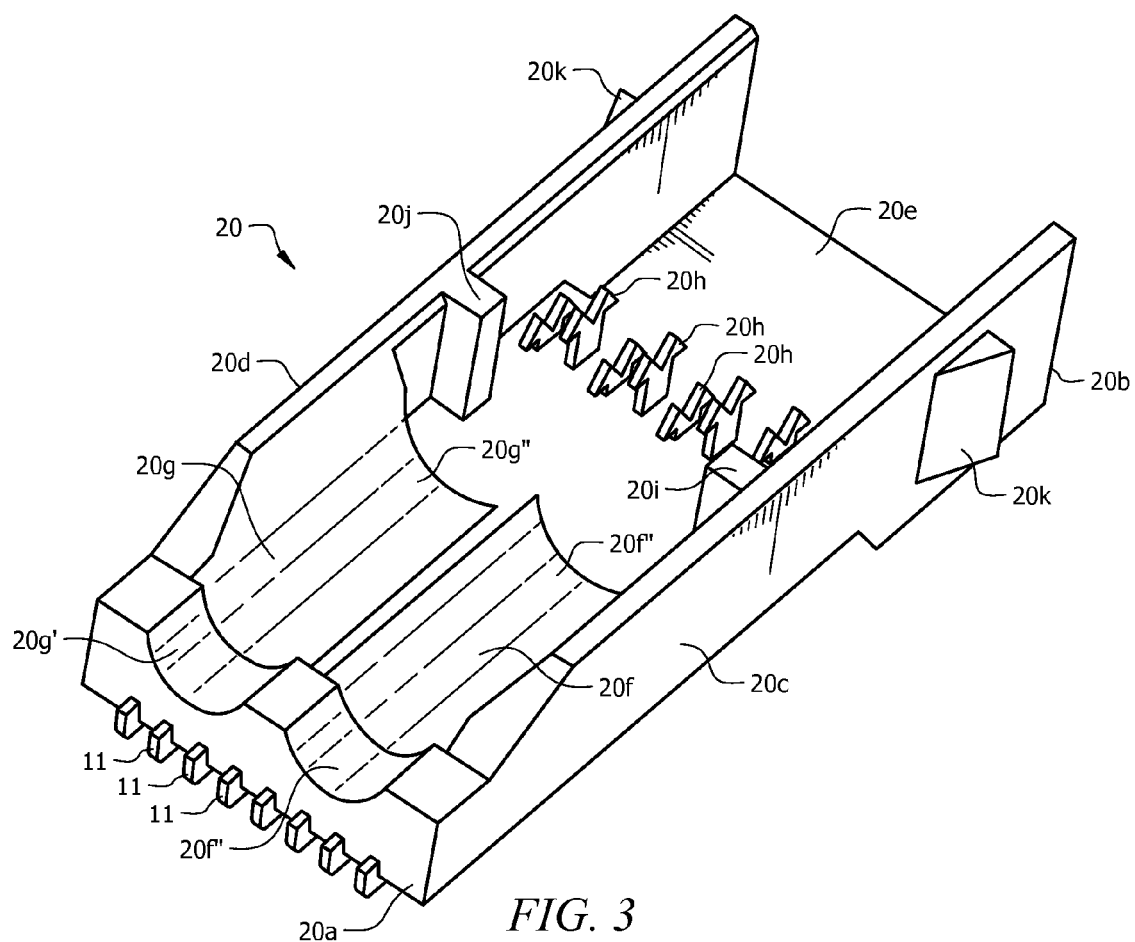
FIG. 3 illustrates a top perspective view of the carrier shown in FIGS. 2A and 2B with the organizer and movable optics system removed to allow insulation displacement contacts (IDCs) of the carrier to be seen.
Figure 4A:
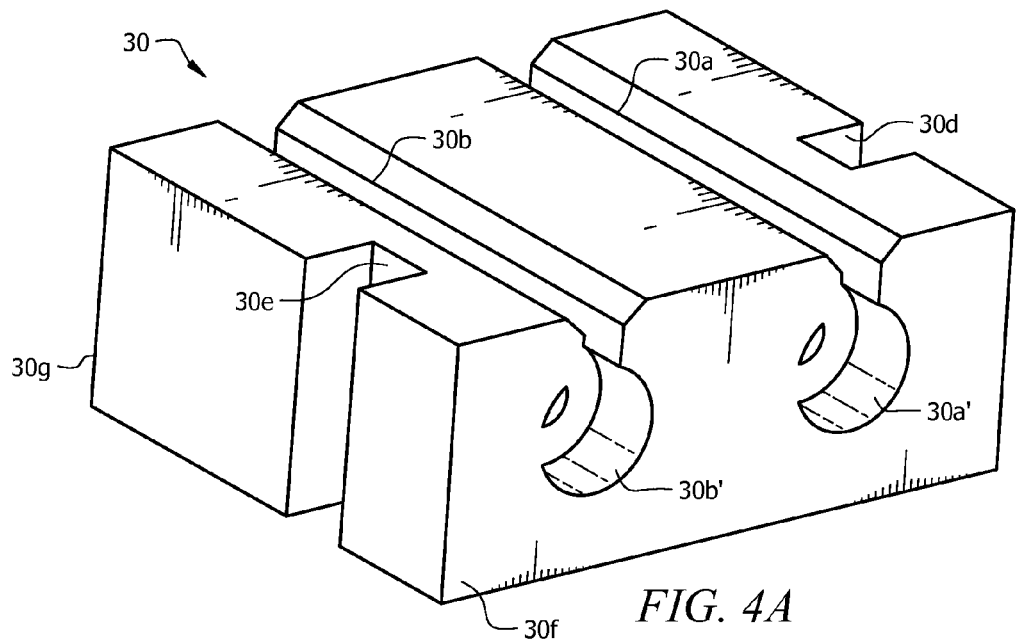
FIGS. 4A and 4B illustrate, respectively, top front and top back perspective views of the organizer shown in FIGS. 2A and 2B.
Figure 4B:
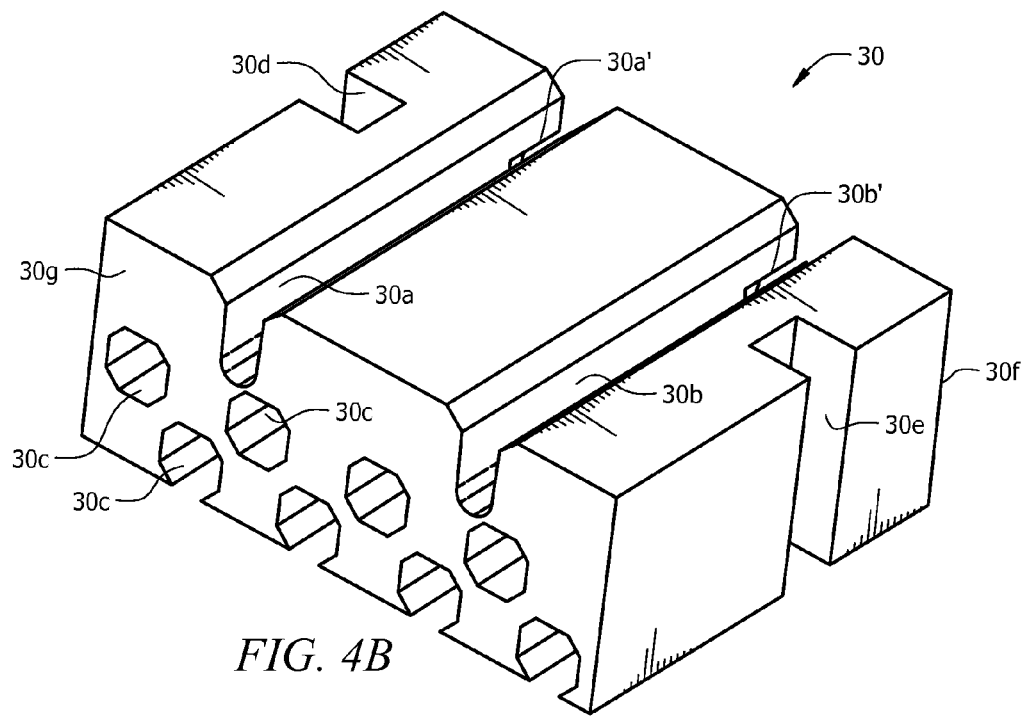

FIGS. 2A and 2B illustrate, respectively, top and back perspective views of a carrier 20 of the hybrid RJ-45 plug 1 shown in FIG. 1 having an organizer 30 and a movable optics system 40 disposed therein in accordance with an illustrative embodiment. FIG. 3 illustrates a top perspective view of the carrier 20 shown in FIGS. 2A and 2B with the organizer 30 and the movable optics system 40 removed. FIGS. 4A and 4B illustrate, respectively, top front and top back perspective views of the organizer 30 shown in FIGS. 2A and 2B. Features of the carrier 20, the organizer 30 and the movable optics system 40 will now be described with reference to FIGS. 1A-4B.

The organizer 30 (FIGS. 4A and 4B) is used to organize the ends of optical fibers (not shown for purposes of clarity) and electrical conductors (not shown for purposes of clarity). The optical fibers and electrical conductors may be parts of a hybrid cable or the fibers may be part of an optical fiber cable and the electrical conductors may be part of an electrical cable (e.g., an Ethernet cable). The organizer 30 has longitudinal slots 30a and 30b formed therein for receiving end portions of respective optical fibers (not shown for purposes of clarity). The organizer 30 has eight blind holes 30c formed therein through which end portions of eight respective electrical conductors (not shown for purposes of clarity) pass. The organizer 30 has slots 30d and 30e formed in opposite sides thereof. The longitudinal slots 30a and 30b have cylindrical front portions 30a' and 30b', respectively, which have respective diameters that are larger in size than the diameters of the longitudinal slots 30a and 30b, respectively. The longitudinal slots 30a and 30b extend from a front end 30f of the organizer 30 to a back end 30g of the organizer 30. The blind holes 30c extend from the back end 30g of the organizer 30 in the direction toward the front end 30f of the organizer 30 parallel to the slots 30a and 30b, and end before reaching the front end 30f of the organizer 30.

The carrier 20 (FIG. 3) has a front end 20a, a back end 20b, a right side 20c, a left side 20d, and an inner lower surface 20e. First and second cradles 20f and 20g are integrally formed in the inner lower surface 20e of the carrier 20 for cradling first and second movable optical ports 40a and 40b (FIGS. 2A and 2B) of the movable optics system 40. The first and second cradles 20f and 20g have front ends 20f' and 20g' and back ends 20f" and 20g" (FIG. 3). The carrier 20 has IDCs 20h (FIG. 3) disposed on its inner lower surface 20e at a location that is in between the back ends 20f" and 20g" of the cradles 20f and 20g and the back end 20b of the carrier 20. The location of the IDCs 20h is typically closer to the back end 20b of the carrier 20 than to the front end 20a of the carrier 20. The IDCs 20h partially extend through the inner lower surface 20e and are connected by respective electrical conductors (not shown for purposes of clarity) to the electrical contacts 11 disposed on the front end 20a of the carrier 20. The carrier 20 has guides 20i and 20j integrally formed on the interior surfaces of sides 20c and 20d, respectively, of the carrier 20 for engaging the slots 30d and 30e, respectively, formed in opposite side walls of the organizer 30.

In a typical RJ-45 plug, the IDCs are disposed on the front end of the plug. In contrast, in accordance with this embodiment, the IDCs 20h are not disposed on the front end of the plug 1, but rather, are located in between the front end 20a and the back end 20b of the carrier 20, and typically closer to the back end 20b than to the front end 20a, or possibly mid-way in between the front end 20a and the back end 20b of the carrier 20. By locating the IDCs 20h in a location that is not on the front end 2a of the plug body 2, more space is available on the front end 2a of the plug body 2 for other purposes. One benefit of this is that it allows the openings 3a and 3b in the front end 2a to be made larger, which allows the respective optical ports of a hybrid RJ-45 jack (not shown for purposes of clarity), which are to be received in the respective openings 3a and 3b, to be made larger Likewise, the larger openings 3a and 3b mean that the front ends 40a' and 40b' (FIG. 2A) of the optical ports 40a and 40b, respectively, which are disposed within, but recessed behind, the respective openings 3a and 3b, can also be made larger. In addition, the lenses (not shown for purposes of clarity) that are within the optical ports can also be made larger. The use of larger optical ports 40a and 40b in the plug 1 and in the jack (not shown for purposes of clarity) allows there to be greater tolerances when making these parts. The greater tolerances allow the parts to be more easily made at lower costs and with increased yield. In addition, the greater tolerances and larger part sizes allow the plug 1 to be more easily assembled, as will be described below in more detail.

The optical ports 40a and 40b have back ends 40a" and 40b" (FIG. 2A) that are received within the respective cylindrical front openings 30a' and 30b' (FIG. 4A) of the respective longitudinal slots 30a and 30b of the organizer 30, as shown in FIG. 2A. The sizes of the diameters of the back ends 40a" and 40b" of the optical ports 40a and 40b are nearly the same, but slightly smaller than, the sizes of the diameters of the cylindrical front openings 30a' and 30b', respectively, of the longitudinal slots 30a and 30b, respectively. This difference between these diameter sizes ensures that the back ends 40a" and 40b" of the optical ports 40a and 40b are seated in the respective cylindrical front portions 30a' and 30b' of the longitudinal slots 30a and 30b such that respective optical axes of the optical ports 40a and 40b are aligned with respective optical axes of the longitudinal slots 30a and 30b. This alignment ensures that respective lenses (not shown for purposes of clarity) of the respective optical ports 40a and 40b are optically aligned with respective optical axes of optical fibers (not shown for purposes of clarity) held within the respective longitudinal slots 30a and 30b of the organizer 30.

The optical ports 40a and 40b (FIGS. 2A and 2B) are generally cylindrical in shape and are at least partially surrounded by compression springs 51 and 52, respectively. The compression springs 51 and 52 have front ends 51a and 52a, respectively, and back ends 51b and 52b, respectively. The front ends 51a and 52a of the springs 51 and 52, respectively, are prevented from moving in the axial directions of the ports 40a and 40b towards the front end 20a of the carrier 20 by respective flanges 40c and 40d formed on the ports 40a and 40b, respectively. The compression springs 51 and 52 have diameters that are smaller than the diameters of the flanges 40c and 40d, respectively. The diameters of the compression springs 51 and 52 are larger than the diameters of the respective cylindrical front openings 30a' and 30b' (FIG. 4A) of the organizer 30, which prevents the back ends 51b and 52b of the springs 51 and 52, respectively, from entering the openings 30a' and 30b', respectively. Thus, the compression springs 51 and 52 are maintained in between the respective flanges 40c and 40d and the organizer 30.

As will be described below in detail, the compression springs 51 and 52 allow some movement of the optical ports 40a and 40b in the axial directions of the ports 40a and 40b, but also force the ports 40a and 40b toward the front end 20a of the carrier 20 to ensure that the front ends 40a' and 40b' of the respective ports 40a and 40b remain in precise alignment with, and in continuous contact with, the respective optical ports (not shown for purposes of clarity) of the jack (not shown for purposes of clarity).

An illustrative embodiment of the process of assembling the plug 1 is as follows. The ends of first and second optical fibers (not shown for purposes of clarity) are inserted into the back ends 40a" and 40b", respectively, of the optical ports 40a and 40b, respectively, and secured thereto with epoxy that is transparent to the operating wavelength of the optoelectronic devices (i.e., laser and photodiode) contained within the jack (not shown for purposes of clarity). The end portions of eight electrical conductors are inserted into the eight blind holes 30*c* of the organizer 30. The organizer 30 is then mechanically coupled with the carrier 20 by aligning the slots 30*d* and 30*e* (FIGS. 4A and 4B) formed in the sides of the organizer 30 with the guides 20*i* and 20*j* formed on the interior surfaces of the opposing sides 20*c* and 20*d* of the carrier 20 and by pressing the organizer 30 down onto the carrier 20 until the organizer 30 is seated on the inner lower surface 20*e* of the carrier 20.

When the organizer 30 is seated in the carrier 20 in this manner, the IDCs 20*h* pass through passageways (not shown for purposes of clarity) formed in the organizer 30 and into the respective holes 30*c* of the carrier 30. As the respective IDCs 20*h* pass into the respective holes 30*c*, the respective IDCs 20*h* pierce the insulation jackets surrounding the respective electrical conductors and thereby come into contact with the respective electrical conductors. The respective IDCs 20*h* are connected by electrical conductors (not shown for purposes of clarity) to the respective electrical conductors 11 disposed along the front end 2*a* and bottom side 2*e* of the plug body 2 (FIG. 1B). In this way, an electrically-conductive pathway is created between the respective electrical conductors disposed in the holes 30*c* of the organizer 30 and the electrical contacts 11.

Once the organizer 30 is engaged with the carrier 20 in this manner, the optical ports 40*a* and 40*b* are mechanically coupled to the organizer 30 and to the carrier 20 in the following manner: the respective optical fibers (not shown for purposes of clarity) are inserted into the respective longitudinal slots 30*a* and 30*b*; the back ends 40*a*" and 40*b*" of the optical ports 40*a* and 40*b*, respectively, are inserted into the respective cylindrical front portions 30*a'* and 30*b'* of the longitudinal slots 30*a* and 30*b*, respectively, of the organizer 30; with the springs 51 and 52 compressed, the front ends 40*a'* and 40*b'* of the optical ports 40*a* and 40*b*, respectively, are laid in the front ends 20*f'* and 20*g'* of the cradles 20*f* and 20*g*, respectively; with the springs 51 and 52 still in a compressed state, forces are exerted on the optical ports 40*a* and 40*b* in directions generally toward the front ends 20*f'* and 20*g'* of the cradles 20*f* and 20*g*, respectively; this assembly is then inserted into the plug body 2 until locking tabs 20*k* located on the outer surfaces of sides 20*c* and 20*d*, respectively, of the carrier 20 engage respective openings 2*k* formed in the sides 2*c* and 2*d*, respectively, of the plug body 2. This interlocks the carrier 30 with the plug body 2.

It should be noted that the sequence of steps that is performed during the assembly process may be different from the sequence described above in accordance with the illustrative embodiment. For example, the optical fibers may be secured to the optical ports at any time during the process before the assembly is inserted into the plug body 2. As another example, the optical ports 40*a* and 40*b* may be coupled with the organizer 30 before or after the organizer 30 is mounted on the carrier 20. Also, the optical fibers may be inserted into the respective slots 30*a* and 30*b* at any time during the assembly process before the assembly is inserted into the plug body 2.

Figure 5:
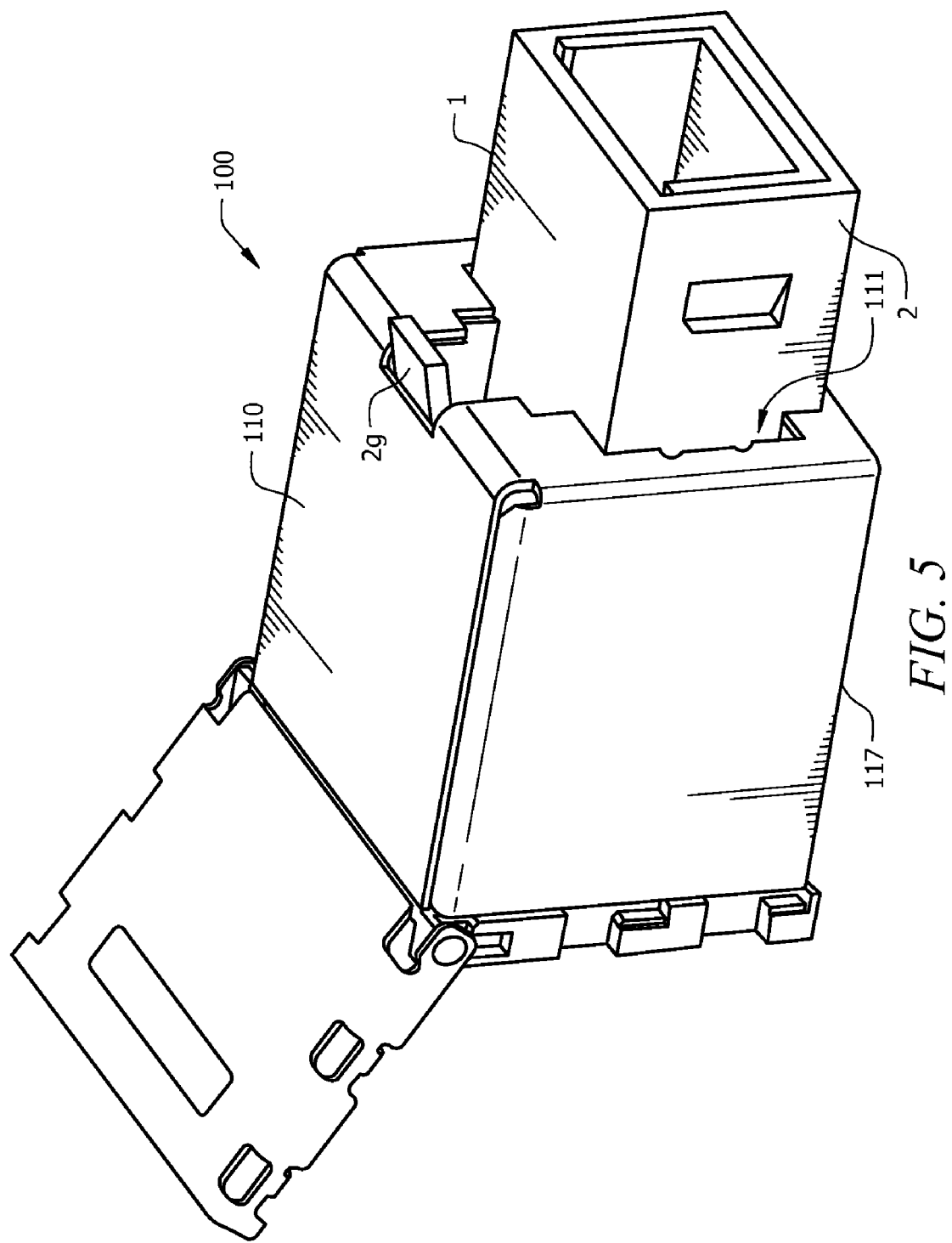
FIG. 5 illustrates a side perspective view of a modular connector assembly comprising the hybrid RJ-45 plug shown in FIGS. 1A and 1B mated with a hybrid RJ-45 jack.
Figure 6:
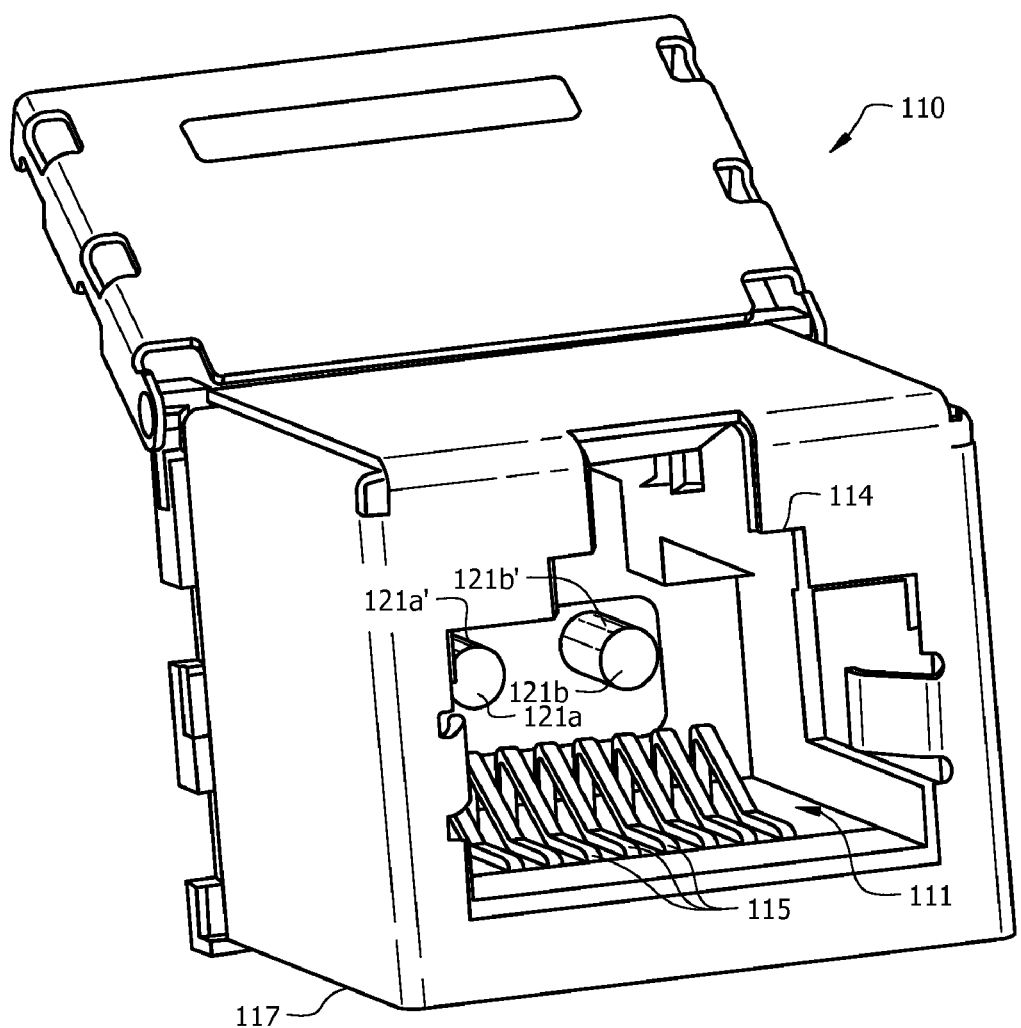
FIG. 6 illustrates a front perspective view of the hybrid RJ-45 jack shown in FIG. 5 with the hybrid RJ-45 plug removed.
Figure 7:
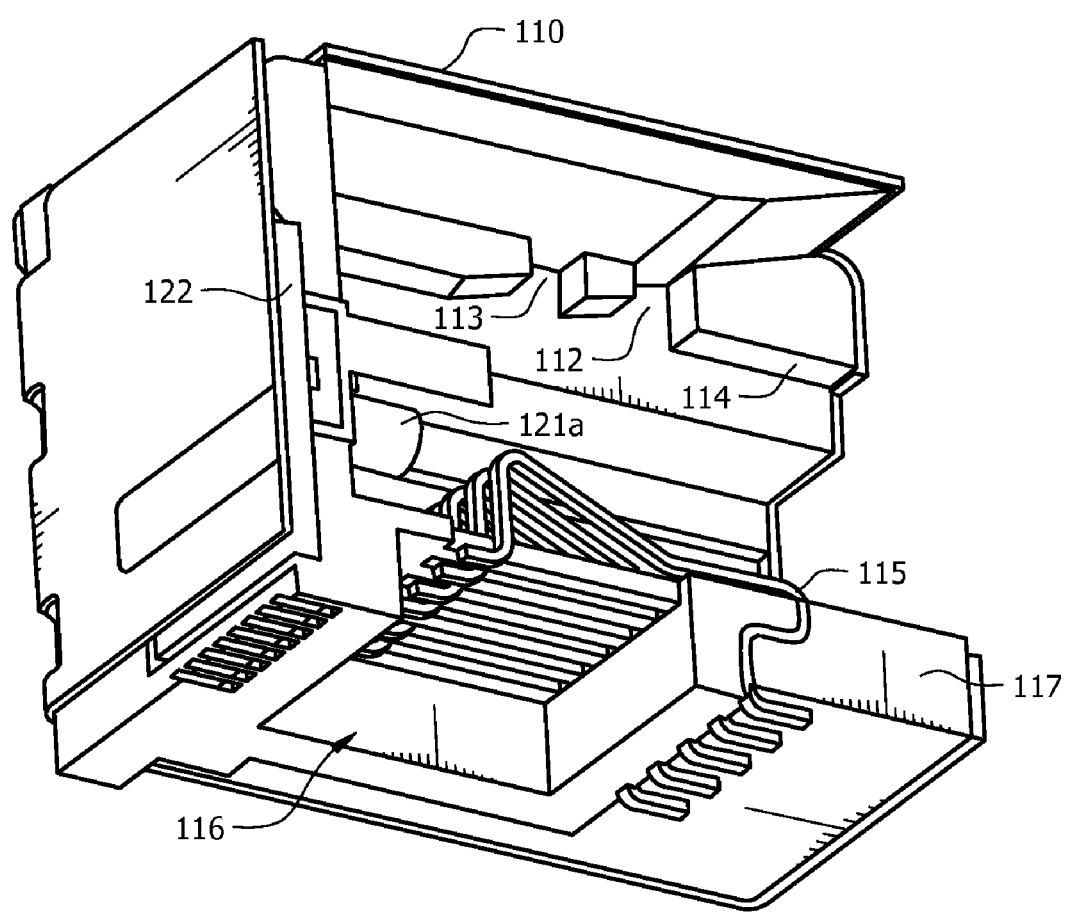
FIG. 7 illustrates a side cross-sectional view of the hybrid RJ-45 jack shown in FIG. 6.
Figure 8:
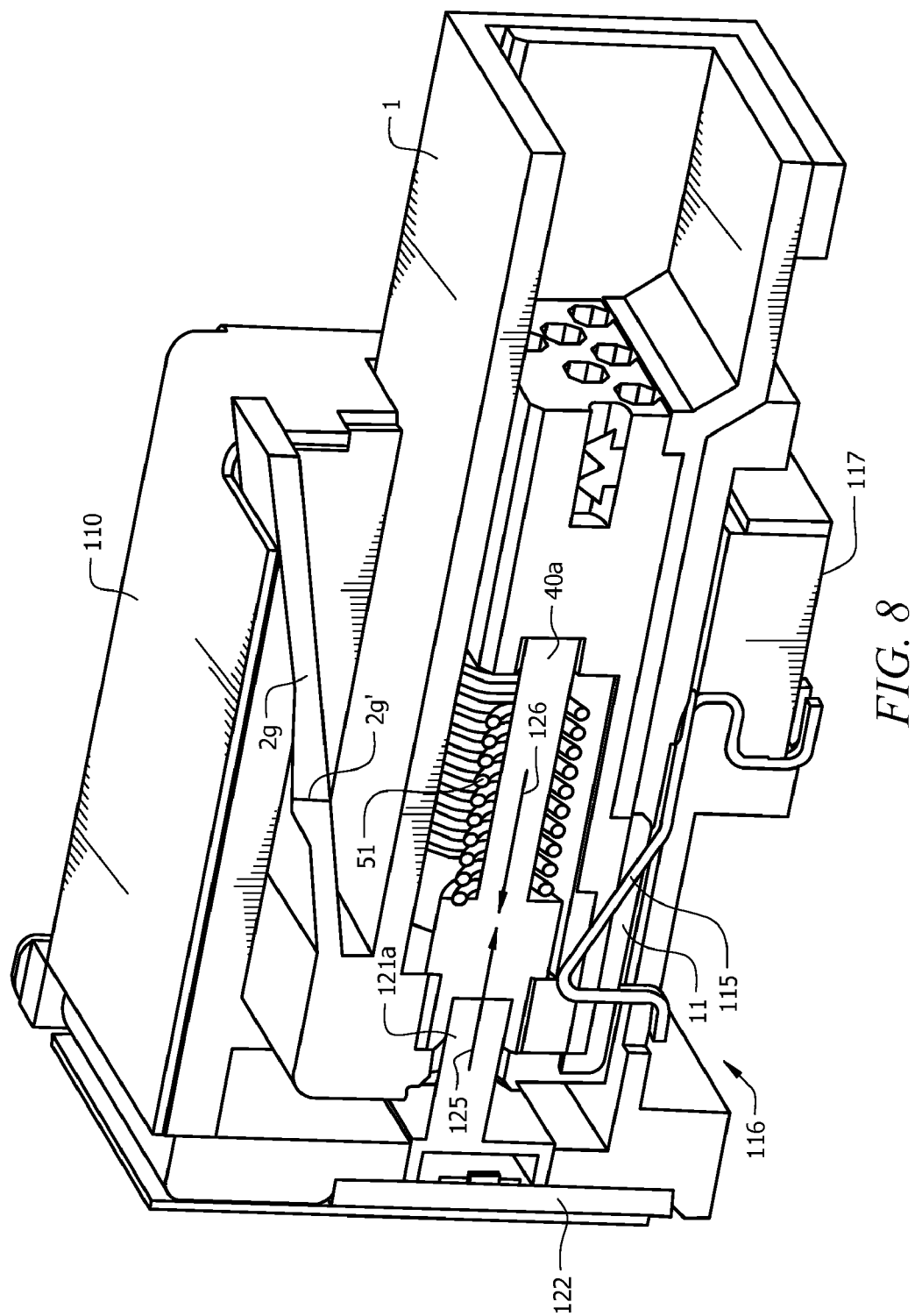
FIG. 8 illustrates a side cross-sectional view of the modular connector assembly shown in FIG. 5, which demonstrates the manner in which the plug mates with the jack.

FIG. 5 illustrates a side perspective view of a modular connector assembly 100 comprising the hybrid RJ-45 plug 1 shown in FIGS. 1A and 1B mated with a hybrid RJ-45 jack 110. FIG. 6 illustrates a front perspective view of the hybrid RJ-45 jack 110 shown in FIG. 5 with the hybrid RJ-45 plug 1 removed. FIG. 7 illustrates a side cross-sectional view of the hybrid RJ-45 jack shown in FIG. 6. FIG. 8 illustrates a side cross-sectional view of the modular connector assembly 100 shown in FIG. 5, which demonstrates the manner in which the plug 1 mates with a hybrid RJ-45 jack 110.

When the plug 1 is inserted into a front opening 111 of the jack 110, the latch mechanism 2*g* of the plug body 2 engages either a first latching feature 112 or a second latching feature 113 formed in a top inner surface 114 of the jack 110, depending on how far the plug 1 is inserted into the front opening of the jack 110. The latch mechanism 2*g* of the plug body 2 has a ridge feature 2*g'* that engages either the first latching feature 112 or the second latching feature 113. If the plug 1 is only inserted far enough into the front opening 111 of the jack 100 to cause the ridge feature 2*g'* to engage the first latching feature 112, the plug 1 and the jack 110 will be in electrical communications with one another. In this position of engagement between the plug 1 and the jack 110, eight electrical contact fingers 115 of the jack 110 are in contact with the respective electrical contacts 11 of the plug 1. This contact between the respective electrical contact fingers 115 of the jack 110 and the respective electrical contacts 11 of the plug 1 causes the contact fingers 115 to be deflected downwards into a pocket 116 formed in a lower surface 117 of the jack 110. The contact fingers 115 have spring characteristics that ensure that they maintain continuous contact with the respective contacts 11 of the plug 1.

If the plug 1 is inserted far enough into the front opening 111 of the jack 100 to cause the ridge feature 2*g'* to engage the second latching feature 113 of the jack 110, the plug 1 and the jack 110 will be in both electrical and optical communications with one another. In this position of engagement between the plug 1 and the jack 110, the eight electrical contact fingers 115 of the jack 110 are in contact with the respective electrical contacts 11 of the plug 1 to establish the electrical connections needed for electrical communications. In addition, in this position, first and second optical ports 121*a* and 121*b* of an optoelectronic (OE) module 122 of the jack 110 are disposed within the first and second openings 3*a* and 3*b*, respectively, formed in the front end 2*a* of the plug body 2.

Inside of the openings 3*a* and 3*b*, front ends 121*a'* and 121*b'* of the ports 121*a* and 121*b*, respectively, of the jack 110 are in abutment with the front ends 40*a'* and 40*b'* of the respective optical ports 40*a* and 40*b* of the plug 1. This abutment pushes the front ends 40*a'* and 40*b'* of the respective ports 40*a* and 40*b* generally in the direction indicated by arrow 125 (FIG. 8). This causes the spring 52 to be compressed by the flanges 40*c* and 40*d* of the optical ports 40*a* and 40*b*, respectively, and by the organizer 30, which causes the spring 51 to exert a force on the optical ports 40*a* and 40*b* generally in the direction indicated by arrow 126 (FIG. 8). This opposing force ensures that there is continuous contact between the ends 121*a'* and 121*b'* of the optical ports 121*a* and 121*b*, respectively, and the ends 40*a'* and 40*b'* of the optical ports 40*a* and 40*b*, respectively, but also allows the optical ports 40*a* and 40*b* to have some freedom of movement in the axial directions of the ports toward and away from the front end 2*a* of the plug body 2.

The cradles 2*f* and 2*g* generally have shapes of half cylinders, but with diameters that are larger than the diameters of the optical ports 40*a* and 40*b*, which allows some freedom of movement of the optical ports 40*a* and 40*b* in directions that are transverse to the axial directions of the ports 40*a* and 40*b*. These freedoms of movement facilitate alignment between the ports 40*a* and 40*b* and the ports 121*a* and 121*b*, respectively, and continuous contact between their front ends 121*a'* and 121*b'* and 40*a'* and 40*b'*, respectively. In addition, the front ends 40*a'* and 40*b'* of the optical ports 40*a* and 40*b* may have outwardly-directed chamfers thereon and the front ends 121a' and 121b' of the optical ports 121a and 121b may have inwardly-directed chamfers thereon. The chamfers ensure that there is very precise mechanical coupling between the ends 40a' and 40b' and the ends 121a' and 121b', respectively. In particular, the chamfers guide the optical ports 40a/121a and 40b/121b from positions of coarse initial alignment into positions of precise final alignment.

The invention is not limited with respect to the configuration of the jack 110. In accordance with the illustrative embodiment of FIGS. 5-7, the jack 110 is a hybrid RJ-45 jack having both electrical and optical communications capabilities. The jack 110 may, however, be a standard RJ-45 jack having only electrical communications capabilities. In the latter case, the jack would not include the OE module 122 and the optical ports 121a and 121b.

It should be noted that the invention has been described with reference to a few illustrative, or exemplary, embodiments for the purposes of demonstrating the principles and concepts of the invention. It will be understood by persons skilled in the art, in view of the description provided herein, that many modifications may be made to the embodiments described herein without deviating from the principles of the invention. For example, the hybrid RJ-45 plug 1 may have a configuration that is different from that shown in FIGS. 1-8. As will be understood by those skilled in the art, all such modifications are within the scope of the invention.

What is claimed is:

1. A hybrid RJ-45 plug comprising:
a plug body having a front end, a back end, a left side, a right side, a bottom side, a top side, and a latch mechanism, the front end having first and second generally-cylindrically-shaped openings formed therein for receiving generally cylindrically-shaped first and second optical ports of a jack, respectively;
a carrier positioned within the plug body, the carrier having a front end, a back end, a right side, a left side, and an inner lower surface, the front and back ends of the carrier facing the front and back ends, respectively, of the plug body, the carrier having a plurality of insulation displacement contacts (IDCs) disposed on the inner lower surface thereof at a location that is in between the front and back ends of the carrier, the IDCs partially extending through the inner lower surface, the carrier having a plurality of electrical contacts disposed on the front end thereof and being connected by a plurality of respective electrical conductors to the respective IDCs, and wherein the plurality of electrical contacts of the carrier are positioned adjacent the front end of the plug body when the carrier is secured within the plug body;
an organizer mechanically coupled to the carrier, the organizer having a front end facing the front end of the carrier and a back end facing the back end of the carrier, the organizer having a plurality of through-holes extending from the back end of the organizer to the front end of the organizer for receiving respective ends of respective electrical conductors, the organizer having at least first and second longitudinal slots extending from the back end of the organizer to the front end of the organizer for receiving respective ends of respective optical fibers, and wherein the respective IDCs partially extend through the organizer into the respective through-holes; and
first and second optical ports disposed on the inner lower surface of the carrier, the ports having front ends that extend into the first and second generally-cylindrically-shaped openings formed on the front end of the plug body and back ends that engage respective front openings of the first and second longitudinal slots of the organizer.

2. The hybrid RJ-45 plug of claim 1, further comprising:
first and second compression springs, the first and second optical ports being disposed within the first and second compression springs, respectively, the first and second compression springs having front ends that are proximate respective flanges disposed on outer surfaces of the first and second optical ports, the first and second compression springs having back ends that are proximate the front openings of the first and second longitudinal slots of the organizer.

3. The hybrid RJ-45 plug of claim 1, further comprising:
first and second guides formed on respective interior surfaces of the right and left sides, respectively, of the carrier; and
first and second slots formed on respective interior surfaces of the right and left sides, respectively, of the organizer, wherein the first and second slots are engaged with the first and second guides, respectively, to thereby mechanically couple the organizer to the carrier.

4. The hybrid RJ-45 plug of claim 1, further comprising:
first and second slots formed in the right and left sides, respectively, of the plug body; and
first and second locking tabs formed on respective exterior surfaces of the right and left sides, respectively, of the carrier, wherein the first and second slots formed in the right and left sides of the plug body are engaged with the first and second guides, respectively, to thereby secure the carrier to the plug body.

5. The hybrid RJ-45 plug of claim 2, wherein if the plug body is mated with a hybrid RJ-45 jack, first and second generally cylindrically-shaped optical ports of the jack are received within the first and second generally-cylindrically-shaped openings formed in the front end of the plug body such that respective front ends of the first and second generally cylindrically-shaped optical ports of the jack abut the respective front ends of the first and second optical ports of the hybrid RJ-45 plug, respectively, causing the first and second optical ports of the plug to move in generally axial directions of the first and second optical ports of the plug away from the front end of the plug body and toward the back end of the plug body, and wherein the movement of the first and second optical ports of the plug causes the first and second compression springs to compress and exert forces on the flanges of the first and second optical ports of the plug in directions that are generally opposite to the generally axial directions of movement of the first and second optical ports of the plug.

6. The hybrid RJ-45 plug of claim 1, further comprising:
first and second cradles formed in the inner lower surface of the carrier, the first and second optical ports of the plug being at least partially disposed in the first and second cradles, respectively.

7. The hybrid RJ-45 plug of claim 1, wherein the IDCs are disposed on the inner lower surface carrier at a location that is closer to the back end of the carrier than to the front end of the carrier.

8. The hybrid RJ-45 plug of claim 1, wherein the plug is backwards compatible with existing standard RJ-45 jacks that have electrical, but not optical, communications capabilities.

9. The hybrid RJ-45 plug of claim 8, wherein the plug is compatible with hybrid RJ-45 jacks that have electrical and optical communications capabilities.

10. A modular connector assembly comprising:
a jack having an opening formed therein for receiving a plug, the jack having generally cylindrically-shaped first and second optical ports disposed within the opening;
a hybrid RJ-45 plug disposed within the opening of the jack and mated with the jack, the plug comprising:
a plug body having a front end, a back end, a left side, a right side, a bottom side, a top side, and a latch mechanism, the front end having first and second generally-cylindrically-shaped openings formed therein for receiving the generally cylindrically-shaped first and second optical ports of the jack, respectively;
a carrier positioned within the plug body, the carrier having a front end, a back end, a right side, a left side, and an inner lower surface, the front and back ends of the carrier facing the front and back ends, respectively, of the plug body, the carrier having a plurality of insulation displacement contacts (IDCs) disposed on the inner lower surface thereof at a location that is in between the front and back ends of the carrier, the IDCs partially extending through the inner lower surface, the carrier having a plurality of electrical contacts disposed on the front end thereof and being connected by a plurality of respective electrical conductors to the respective IDCs, and wherein the plurality of electrical contacts of the carrier are positioned adjacent the front end of the plug body when the carrier is secured within the plug body;
an organizer mechanically coupled to the carrier, the organizer having a front end facing the front end of the carrier and a back end facing the back end of the carrier, the organizer having a plurality of through-holes extending from the back end of the organizer to the front end of the organizer for receiving respective ends of respective electrical conductors, the organizer having at least first and second longitudinal slots extending from the back end of the organizer to the front end of the organizer for receiving respective ends of respective optical fibers, and wherein the respective IDCs partially extend through the organizer into the respective through-holes; and
first and second optical ports disposed on the inner lower surface of the carrier, the ports having front ends that extend into the first and second generally-cylindrically-shaped openings formed on the front end of the plug body and back ends that engage respective front openings of the first and second longitudinal slots of the organizer.

11. The modular connector assembly of claim 10, wherein the hybrid RJ-45 plug further comprises:
first and second compression springs, the first and second optical ports being disposed within the first and second compression springs, respectively, the first and second compression springs having front ends that are proximate respective flanges disposed on outer surfaces of the first and second optical ports, the first and second compression springs having back ends that are proximate the front openings of the first and second longitudinal slots of the organizer.

12. The modular connector assembly of claim 10, wherein hybrid RJ-45 plug further comprises:
first and second guides formed on respective interior surfaces of the right and left sides, respectively, of the carrier; and
first and second slots formed on respective interior surfaces of the right and left sides, respectively, of the organizer, wherein the first and second slots are engaged with the first and second guides, respectively, to thereby mechanically couple the organizer to the carrier.

13. The modular connector assembly of claim 10, wherein the hybrid RJ-45 plug further comprises:
first and second slots formed in the right and left sides, respectively, of the plug body; and
first and second locking tabs formed on respective exterior surfaces of the right and left sides, respectively, of the carrier, wherein the first and second slots formed in the right and left sides of the plug body are engaged with the first and second guides, respectively, to thereby secure the carrier to the plug body.

14. The modular connector assembly of claim 11, wherein respective front ends of the first and second generally cylindrically-shaped optical ports of the jack abut the respective front ends of the first and second optical ports of the hybrid RJ-45 plug, respectively, causing the first and second optical ports of the plug to move in generally axial directions of the first and second optical ports of the plug away from the front end of the plug body and toward the back end of the plug body, and wherein the movement of the first and second optical ports of the plug causes the first and second compression springs to compress and exert forces on the flanges of the first and second optical ports of the plug in directions that are generally opposite to the generally axial directions of movement of the first and second optical ports of the plug.

15. The modular connector assembly of claim 10, wherein the hybrid RJ-45 plug further comprises:
first and second cradles formed in the inner lower surface of the carrier, the first and second optical ports of the plug being at least partially disposed in the first and second cradles, respectively.

16. The modular connector assembly of claim 10, wherein the IDCs are disposed on the inner lower surface carrier at a location that is closer to the back end of the carrier than to the front end of the carrier.

17. The modular connector assembly of claim 10, wherein the jack has latching features thereon for engaging the latch mechanism of the plug in either a first position or a second position, wherein in the first position of engagement, the jack and the plug have electrical, but not optical, communications capabilities, and wherein in the second position of engagement, the jack and the plug have electrical and optical communications capabilities.

18. A method for assembling a hybrid RJ-45 plug comprising:
providing a plug body having a front end, a back end, a left side, a right side, a bottom side, a top side, and a latch mechanism, the front end having first and second generally cylindrically-shaped openings formed therein;
providing a carrier having a front end, a back end, a right side, a left side, and an inner lower surface, the carrier having a plurality of insulation displacement contacts (IDCs) disposed on the inner lower surface thereof at a location that is in between the front and back ends of the carrier, the IDCs partially extending through the inner lower surface, the carrier having a plurality of electrical contacts disposed on the front end thereof and being connected by a plurality of respective electrical conductors to the respective IDCs;
providing an organizer having a plurality of holes extending from the back end of the organizer at least partially through the organizer in a direction toward the front end of the organizer, the organizer having at least first and second longitudinal slots extending from the back end of the organizer to the front end of the organizer, wherein the respective IDCs partially extend through the organizer into the respective through-holes;

placing respective end portions of a plurality of electrical conductors in the respective holes;

mechanically coupling the organizer with the carrier, wherein mechanically coupling the organizer with the carrier causes the IDCs to pierce insulating jackets of the respective electrical conductors disposed in the respective through-holes;

placing first and second optical ports on the inner lower surface of the carrier such that front ends of the ports extend into the first and second generally-cylindrically-shaped openings formed on the front end of the plug body and back ends of the first and second optical ports engage respective front openings of the first and second longitudinal slots of the organizer, wherein the first and second optical ports have respective ends of first and second optical fibers secured therein, and wherein respective portions of the first and second optical fibers are disposed in the first and second longitudinal slots, respectively; and mechanically coupling the carrier with the plug body such that the carrier and the organizer are disposed within an opening formed in the plug body.

19. The method of claim 18, wherein the RJ-45 hybrid plug further comprises:

first and second guides formed on respective interior surfaces of the right and left sides, respectively, of the carrier; and first and second slots formed on respective interior surfaces of the right and left sides, respectively, of the organizer, and wherein the organizer is mechanically coupled with the carrier by engaging the first and second slots with the first and second guides, respectively.

20. The method of claim 18, wherein the plug further comprises:

first and second slots formed in the right and left sides, respectively, of the plug body; and first and second locking tabs formed on respective exterior surfaces of the right and left sides, respectively, of the carrier, and wherein the carrier is mechanically coupled with the plug body by engaging the first and second locking tabs with the first and second slots, respectively, formed in the plug body.

* * * * *